Patented Oct. 14, 1952

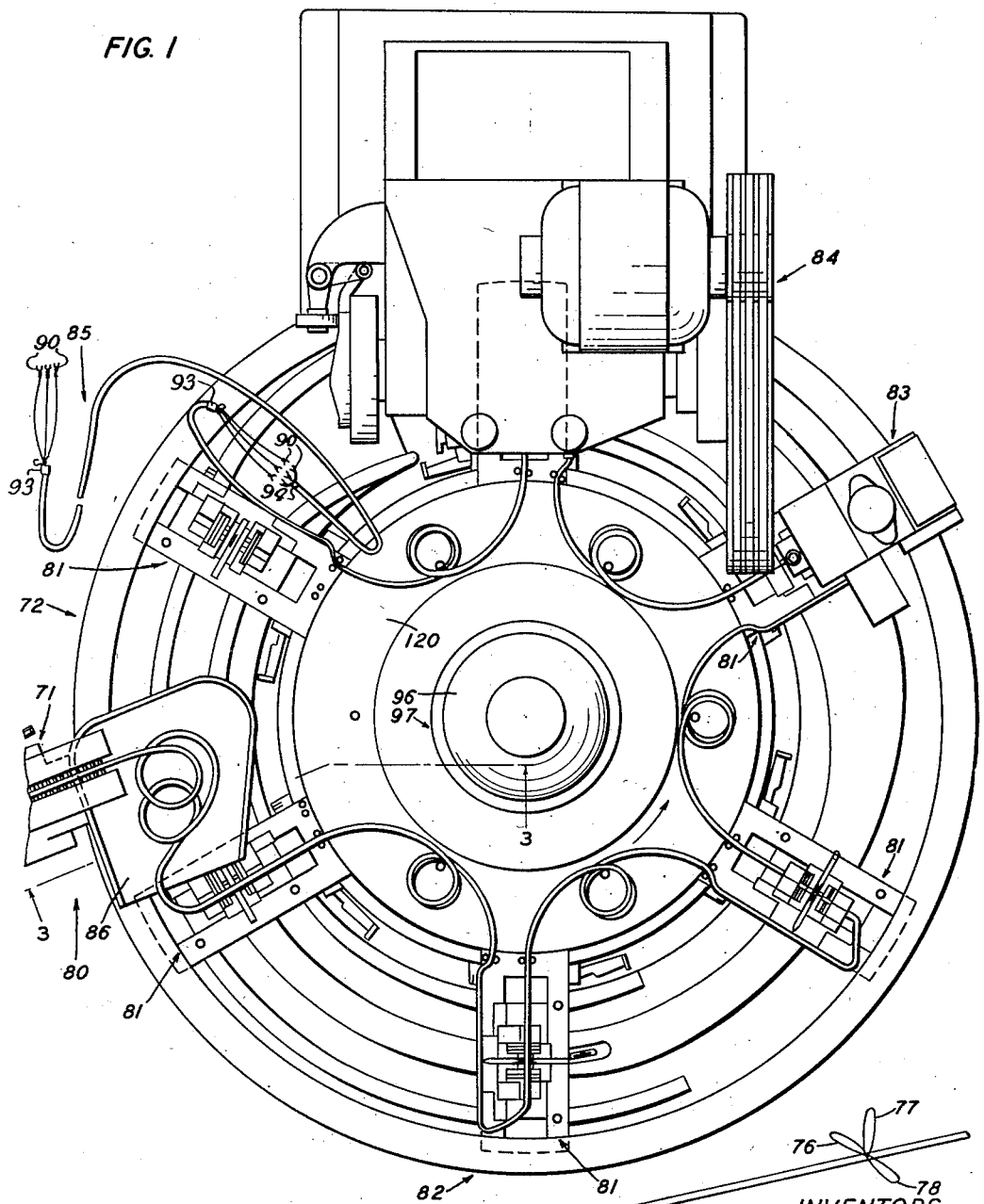
FIG. 1
FIG. 2
INVENTORS
R. T. ADAMS
J. A. WAGNER
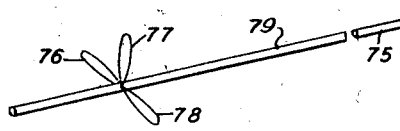
BY
ATTORNEY

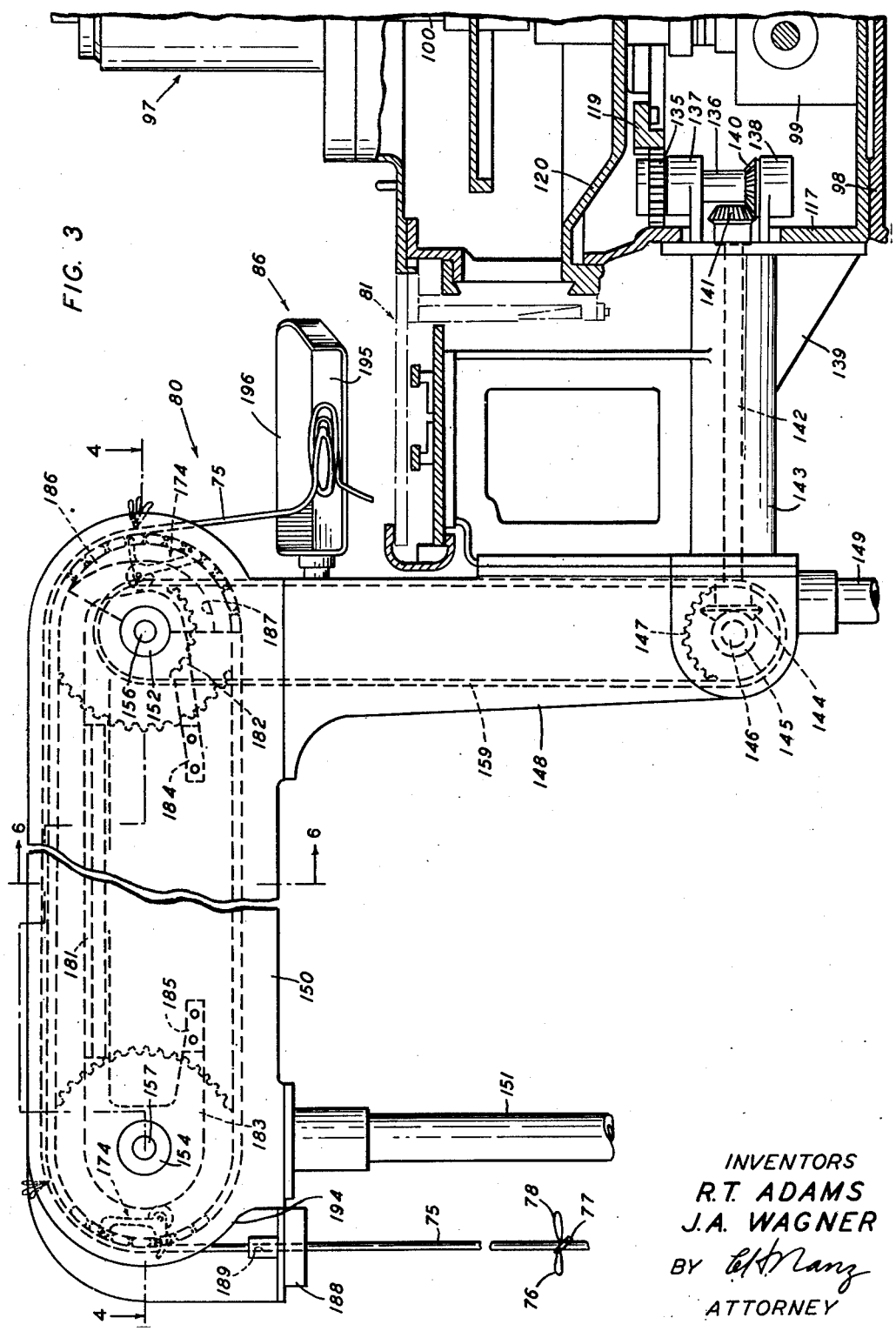

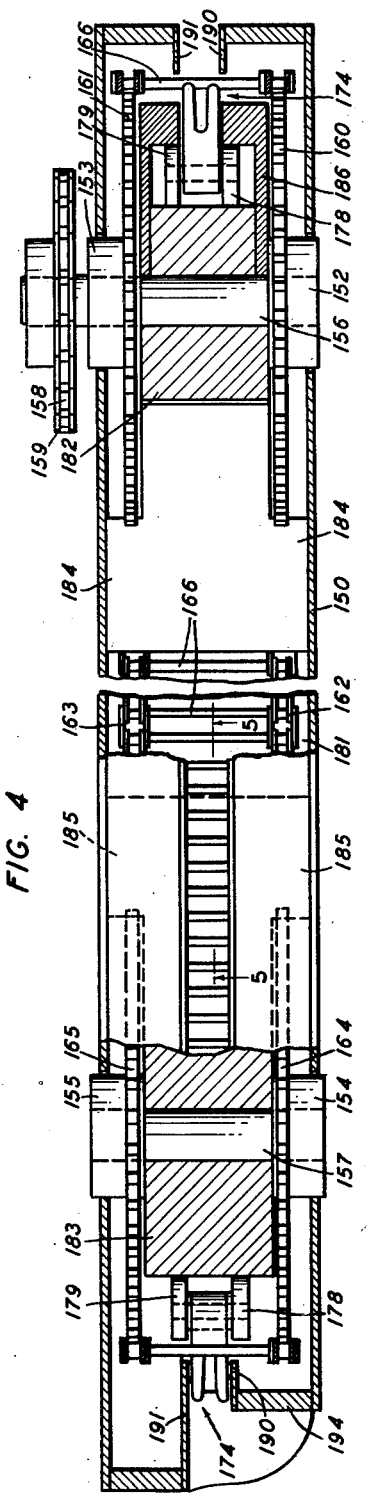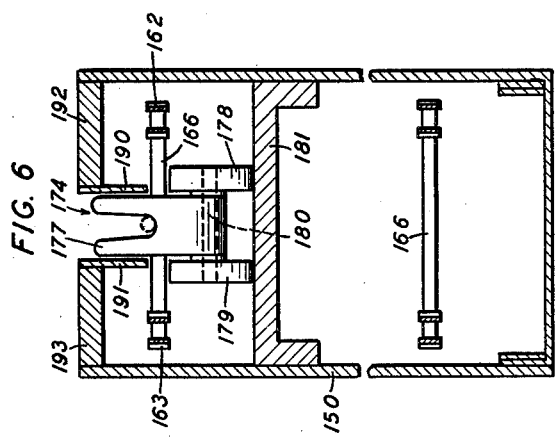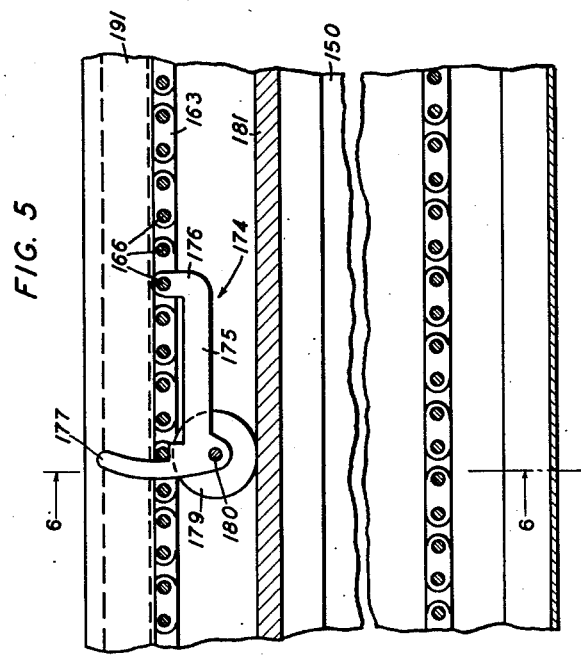

2,613,426

UNITED STATES PATENT OFFICE 2,613,426

APPARATUS FOR ADVANCING ELECTRICAL CORDAGE

Robert T. Adams, Chatham, N. J., and Julius A. Wagner, Cleveland Heights, Ohio, assignors to Western Electric Company, Incorporated, New York, N. Y., a corporation of New York Original application January 11, 1945, Serial No. 572,414. Divided and this application February 24, 1947, Serial No. 730,513

11 Claims. (Cl. 28—71.5)

This invention relates to apparatus for advancing electrical cordage, and more particularly to apparatus for advancing continuous electrical cordage to apparatus for forming multi-conductor double-ended cords from the cordage.

This application is a division of our copending application Serial No. 572,414, filed January 11, 1945, for "Article Forming Apparatus," now abandoned.

In the telephone and like industries, large numbers of multiconductor cords are used for interconnecting cooperating pieces of electrical apparatus. In the manufacture of these cords, it has been found desirable to braid a continuous covering on the cord and at measured intervals along the cordage to form loops in the conductors which extend through the covering of braid. This operation is performed in the braiding of the cord and when the cordage is formed in this manner, it is not necessary to strip off the braid covering in forming short double-ended cords since, by severing the braid covering, the lengths of individually insulated conductors which have been thrown out or pulled through the braid may have terminal members attached to them and may be trimmed to the desired lengths.

It is an object of the present invention to provide novel and efficient apparatus for advancing electrical cordage.

In accordance with one embodiment of the invention, cordage which has had the conductors looped or thrown out through its braided covering is fed by an advancing apparatus from a suitable supply thereof to a severing and terminal attaching mechanism. The advancing apparatus includes a yoke which slips over the portions of the cordage between the looped conductors but does not slip over the looped conductors, and means for moving the yoke toward the severing and terminal attaching mechanism.

A complete understanding of the invention may be had by reference to the following detailed description of an apparatus forming a specific embodiment thereof, when considered in conjunction with the accompanying drawings, wherein Fig. 1 is a plan view, partly broken away, of an apparatus embodying the invention;

Fig. 2 is a view in perspective of a length of cordage supplied to the machine and showing the individually insulated conductors thrown out of the cordage at spaced intervals;

Fig. 3 is a vertical sectional view taken substantially along the line 3—3 of Fig. 1;

Fig. 4 is a horizontal sectional view taken substantially along the line 4—4 of Fig. 3 with portions thereof broken away;

Fig. 5 is a fragmentary vertical sectional view taken substantially along the line 5—5 of Fig. 4; and Fig. 6 is a fragmentary vertical sectional view taken substantially along the line 6—6, as shown on either Fig. 3 or Fig. 5.

A cordage-advancing apparatus 80 (Fig. 1) of the preferred embodiment of the invention is designed to advance to a cord-forming apparatus 72, which forms the subject matter of our above-mentioned copending application, cordage 75 (Fig. 2), which comprises three separately insulated conductors 76, 77 and 78 having a covering of braid 79 thereon, as shown most clearly in Fig. 2, enclosing the three individually insulated conductors throughout most of its length, but having the three insulated conductors 76, 77 and 78 drawn out through the braid 79 at predetermined intervals, which intervals determine the length of the cords to be formed. The amount that the individual conductors 76, 77 and 78 are drawn through the braid, in the process of applying the braid on the conductors, will determine the length of the conductor extending out at the ends of the braided cords after the braid has been severed at the point where the conductors extend from it and after the conductors have each been cut. The braided cordage is fed to the mechanism for cutting it at the point where the conductors extend from it by the cordage-advancing apparatus 80, which operates in timed relation to the remainder of the apparatus and the cordage, as it is fed to the rest of the processing mechanism, may be positioned on one of a plurality of cordage-positioning plates 81, there being six cordage-positioning plates provided in the apparatus. These plates are suitably supported, as will be described hereinafter, to travel in a circular path, which will carry them to a cordage-severing station 82, an inspection and tucking station 83, a punch press station 84, and an unloading station 85.

At the cordage-advancing apparatus 80, the cordage will be fed onto a suitable platform 86, from which an operator may remove a section of cordage and place it on a cordage-positioning plate 81, moving past the feeding mechanism, with the cordage so positioned that the loops of individually insulated conductors 76, 77 and 78 extending out from it will be located in a predetermined position on the plate, as will be described more in detail hereinafter. The plate, in the operation of the apparatus, will be carried around to a cordage-severing station, where the braid 79 will be cut at the point at which the conductors 76, 77 and 78 extend through it. In travelling in its circular path, the plate will next arrive at the inspection station and, in travelling to this station, the severed ends of the braid 79 will be moved apart slightly so that when the cordage-positioning plate 81 arrives at the inspection and tucking station, a mechanism may be brought into operation to tuck the surplus portions of the individual conductors down through the plate 81 and locate the individual conductors in proper position to receive terminal members 90—90 to each of the conductors 76, 77 and 78, and also to determine whether the individual conductors are properly positioned on the positioning plate.

The individual conductors 76, 77 and 78 each has two terminal members 90—90 attached to it in the punch press station 84, and, thereafter, in the same operation, the conductors 76, 77 and 78 each has a section cut from it in the position between the formed terminal members 90—90. The terminal members 90—90 are fed to the punch press mechanism in strip form, and all of the terminal members in the strip are interconnected. In the punch press mechanism, however, the mechanism provided, in addition to attaching the terminals to the conductors 76, 77 and 78, also cuts the terminals apart so that when the cordage-positioning plates 81 move out of the punch press, the terminals will be separated one from another and will be attached to their conductors. At the punch press station 84, S-hooks 93 partially formed and interconnected in a strip (not shown) are cut from their strip and attached to the cordage to form a supporting means. Similarly, stay bands 94 interconnected in a strip (not shown), and partially formed, are fed into the punch press, cut from their strip and attached to the cordage 75. The S-hooks 93 and stay bands 94 serve to support the cords in position in electrical apparatus without applying tension to the individual conductors and, in addition, serve to prevent unravelling of the braid 79 from the cords. After the operations on the cordage 75 have been performed at the punch press station, the plates 81 will move up out of the punch press station to the unloading station 85, where the completed cords may be stripped from the plates.

The main driving mechanism for the apparatus comprises a motor 96 (Fig. 1) mounted upon the upper end of a housing assembly 97. The housing assembly 97 comprises a main supporting base 98 (Fig. 3) for supporting a main base casting 99. Suitably supported on the main base casting 99 is a tubular bearing member 100, which extends up through the center of the apparatus. The motor 96 through suitable gearing (not shown) rotates a ring gear 119 fixed to the underside of a dial supporting casting 120. The dial supporting casting encircles the tubular bearing member 100 and is mounted for rotation therearound by suitable means (not shown). The casting 120 is of irregular configuration and serves to support the cordage-positioning plates in their rotation around the apparatus.

The ring gear 119 meshes with a pinion 135 mounted upon the end of a stud shaft 136 suitably journalled in journal members 137 and 138, which are mounted upon a bracket 139 attached to the outer surface of a casing member 117. The shaft 136 has a beveled pinion 140 fixed to it in position to mesh with a pinion 141 fixed to a shaft 142. The shaft 142 is suitably journalled in a tubular portion 143 of the bracket 139, and carries at its left end (Fig. 3) a beveled pinion 144. The beveled pinion 144 meshes with a pinion 145 on a shaft 146, which has a sprocket 147 also fixed to it. The shaft 146 is suitably journalled in a chain guard 148 attached to the end of the tubular portion 143 of the bracket 139 and supported on a standard 149. At its upper end, the chain guard 148 supports one end of a feed chain housing 150, the other end of which is supported upon a standard 151. Mounted in the feed chain housing 150 are two pairs of bearings 152 and 153 and 154 and 155 (Fig. 4), the bearings 152 and 153 supporting a shaft 156 and the bearings 154 and 155 supporting a shaft 157. The shaft 156 extends out through the bearing 153 and has fixed to it a sprocket 158, which is interconnected with the sprocket 147 by a chain 159. Through this driving connection, the sprocket 147 is driven at a uniform speed from the main drive mechanism of the apparatus and drives the shaft 156. The shaft 156 has attached to it a pair of sprockets 160 and 161, which serve to drive chains 162 and 163 engaging the sprockets and supported at their left end (Fig. 4) by sprockets 164 and 165 mounted upon the shaft 157. The sprockets 164 and 165 are idlers and simply serve to support the left end (Fig. 4) of the chains 162 and 163, which are provided with pins 166—166 common to the two chains 162 and 163 and extending across the driving sprockets 160 and 161 and the idler sprockets 164 and 165.

At spaced intervals throughout the length of the chains 162 and 163, the pins 166 have feed members or pullers designated generally by the numeral 174 pivotally mounted upon them. Each of the feed members 174 comprises, as shown most clearly in Figs. 5 and 6, a lever 175 having an upwardly extending pivot portion 176 pivoted about one of the pins 166 and having a bifurcated portion or yoke 177 adapted to extend up between two adjoining pins 166 for engaging in the notch of the yoke 177 conductors 76, 77 and 78 extending out through the braid 79. The feed members 174 are mounted on the chains 162 and 163 at such a spacing that the distance between two feed members is slightly greater than the shortest spacing between two conductor loops along the cordage. The chain drive is so timed that each portion of the cordage at which the loops emerge from the braid is deposited on the machine opposite a plate, following which the chain runs freely, without feeding additional cordage until the next feed member 174 engages the next set of conductor loops after a short free travel of the chain. In this manner, the feeding of cordage is kept in synchronism with the timing of the machine, so that one set of loops is deposited on each positioning plate, regardless of uncontrollable variations in the spacing of the conductor loops along the cordage.

The left end of the lever 175 has a pair of cam rollers 178 and 179 mounted upon it, a stud shaft 180 extending through the lever 175 for supporting the cam rollers for free rotation with respect to the lever 175. In the housing 150, there is provided a cam plate 181, which extends across the housing and is fixed to the side walls thereof in position to support the cam rollers 178 and 179 in an elevated position, where they will hold the lever 175 with the yoke 177 thereof extending upwardly between two adjoining pins 166. This plate 181 abuts and cooperates with a pair of cam members 182 and 183, which surround the shafts 156 and 157 and are attached to the side plates of the housing 150 by extensions 184 and 185 extending from opposite sides of the cam members 182 and 183, respectively, to engage the side plates of the housing 150. The cam member 183 is so formed that a feed member 174 carried by the chains 162 and 163 and held with its yoke 177 extending through between adjoining pins 166 on the lower course of the chains will be held in position to extend beyond the pins 166 as the feed member travels around the cam member 183 to the upper course of the chains. In this manner, the notch of the yoke 177 will engage conductors 76, 77 and 78 extending out through the braid 79 and will advance the cordage 75. The cam plate 181 is so positioned that it will hold the bifurcated portion 177 of the feed member 174 above the tops of the pins 166 on the upper course of the chains 162 and 163 and thus the cordage 75 will be fed across the top of the cordage-advancing apparatus 80.

At the right end of the feed chain housing 150 (Fig. 3), it is necessary to withdraw the bifurcated portion 177 of the feed member 174 from engagement with the cordage, and, accordingly, the cam member 182 has an auxiliary cam member 186 suitably attached to it for engaging the cam rollers 178 and 179 to rock the feed member 174 relative to the pin 166, on which it is pivoted. The cam member 182 is shaped to cooperate with the auxiliary cam member 186 and the rollers 178 and 179 will travel in the cam groove 187 defined by the cam member 182 and auxiliary cam member 186. The auxiliary cam member 186 terminates directly below the center of the shaft 156 and the cam member 182 slopes downwardly from the point of termination of the auxiliary cam member 186 in such manner that it will direct the free end of the feed member 174 having the bifurcated portion 177 thereon to a position where the bifurcated portion will extend through the chain pins 166.

At its left end (Figs. 3 and 4), the chain housing 150 is provided with a guide member 188 having a guide channel 189 extending through it, through which cordage 75 fed from any suitable supply may be directed to a passageway (Fig. 4) defined by the inner plates 190 and 191 and the pins 166 extending between the chains 162 and 163. The inner plates 190 and 191 are mounted upon and extend downwardly from top plates 192 and 193 (Fig. 6) comprising parts of the housing 150. The front portion of the housing 150, as viewed in Fig. 3, is formed, as shown at 194, to facilitate the stringing of cordage 75 in the feeding mechanism 80 and the plates 190 and 191 are extended downwardly at this portion of the apparatus to prevent the entanglement of the cordage 75 in the driving elements of the feed mechanism. Similarly, the inner plates 190 and 191 extend downwardly at the right end (Figs. 3, 4 and 6) of the feeding mechanism to prevent the cordage from becoming entangled in the driving elements of the feeding mechanism.

Adjacent to the right end of the housing 150 (Fig. 3) and positioned to receive cordage fed by the feed members 174 is the platform or tray 86, which is provided with a base 195 and an upstanding rim 196. The rim 196 extends partially around the base 195, being open at the end thereof adjacent to the position where an operator may remove cordage which has been fed onto the platform or tray 86. The platform or tray 86 is suitably mounted upon the chain guard 148 and, as the cordage 75 is fed to it, cordage will coil in rough coils on the platform 86 in a manner such that it may be conveniently removed therefrom and placed on a cordage-positioning plate 81 in the proper position of alignment. It should be noted at this time that, as described hereinbefore, the feed members 174 are spaced apart a distance such that one length of cordage between two points where the conductors extend through the braided covering thereon will be deposited on the platform or tray 86 each time a cordage-positioning plate 81 is in position adjacent to the tray or platform 86 to receive the cordage and that an operator stationed at this portion of the apparatus inserts the cordage on the plate 81.

In the operation of the cordage-advancing apparatus 80, the main driving motor 96 is started to revolve the cordage-positioning plates 81, and rotate the ring gear 119. As the ring gear 119 rotates, it will carry the dial supporting casing 120 with it around the tubular bearing member 100 (Fig. 3). As the ring gear 119 rotates, it will, through pinion 135 and stud shaft 136, transmit power through gears 140 and 141 to shaft 142 (Fig. 3). Shaft 142, through pinions 144 and 145, will drive chain 159 and through the chain 159 will transmit power to drive the sprockets 160 and 161 (Fig. 4). The endless traction element comprising the chains 162 and 163 and their interconnecting pins 166 will thus travel in a clockwise direction around the sprockets 160, 161, 164 and 165. As the pins 166 thus travel clockwise, the feed members or pullers 174 will engage the looped conductors 76, 77 and 78 extending out from the braid 79 and, accordingly, will advance the cordage across the feed chain housing 150. As the feed members 174 travel across the top level of the feeding mechanism, they will be held in position where they extend upwardly an appreciable distance beyond the upper surface of the pins 166 and will thus pull the cordage 75 along with them until they arrive in position at the right end (Fig. 3) of the housing 150, where they will be retracted by the auxiliary cam member 186. In this manner, cordage will be fed onto the platform 86, from which the operator may remove a length of cordage equal to the distance between the places on the cordage where the conductors are looped through the braided covering.

The above-described cordage-advancing apparatus 80 (Fig. 3) serves to advance the cordage 75 to the cordage-receiving tray 196 in perfect synchronism with the operation of the cord-forming apparatus 72. The cordage-advancing apparatus 80 is also suitable to advance filaments of types different from the cordage 75 but having portions which will slip through the bifurcated portions 177 and portions which will not slip therethrough.

What is claimed is:

1. Apparatus for advancing continuous cordage having enlarged portions at spaced points therealong and small portions therebetween, which comprises a member having a notch therein of such a size as to permit the small portions of such cordage to slip therethrough and to prevent the enlarged portions from slipping therethrough, means independent of the cordage for advancing the member along a predetermined path, means for guiding the cordage into the notch in the member at one point in said path, and means for effecting withdrawal of the cordage from said slot at a second point in said path, whereby the cordage is advanced along the portion of the path between said points.

2. Apparatus for feeding to a processing machine continuous cordage including a plurality of conductors with a continuous covering thereover and having the conductors thrown in loops through and out of the covering at points along the covering spaced equidistantly apart, which comprises an endless traction element, means for moving said element along a predetermined path in timed relationship with respect to the processing machine, a puller carried by the traction element and having a notch therein large enough to permit portions of such cordage between said points to slide therethrough and small enough to prevent a portion of the cordage at such a point from sliding therethrough, means for guiding into the notch in the puller a portion of the cordage between two of said points at a predetermined point in the travel of the puller, and means for effecting disengagement between said puller and said cordage at a second predetermined point in the travel of said puller near the machine to deliver the cordage to the machine in timed relationship with respect thereto.

3. Apparatus for feeding to a processing machine continuous cordage including a plurality of conductors with a continuous covering thereover and having the conductors thrown in loops through and out of the covering at points along the covering spaced equal predetermined distances apart, which comprises an endless traction element, means for moving said element along a predetermined path in synchronization with the machine, a plurality of pullers carried by the traction element at points spaced apart therealong a predetermined distance greater than that between two of said points on such cordage, each of said pullers having a notch therein large enough to permit portions of such cordage between said points to slide therethrough and small enough to prevent a portion of the cordage at such a point from sliding therethrough, means for successively guiding into the notches in the pullers portions of the cordage between said points at a predetermined point in the travel of the pullers, and means for successively effecting disengagement between said pullers and said cordage at a second predetermined point in the travel of said members near the machine to deliver looped portions of the cordage to the machine in synchronization therewith.

4. Apparatus for feeding to a processing machine continuous cordage including a plurality of conductors with a continuous covering thereover and having the conductors thrown in loops through and out of the covering at points along the covering spaced equal predetermined distances apart, which comprises an endless chain, means for moving the chain along a predetermined path including a loading point and a delivery point, an arm carried pivotally by the chain, a yoke carried by the free end of the arm, a cam follower carried by the arm, and a cam track engaging the cam follower for moving the yoke through the cam follower and the arm to a position extending outwardly from the chain as the yoke is moved toward the loading point, for holding the yoke in such a position as the yoke is moved from the loading point to the delivery point and for withdrawing the yoke from such a position at the delivery point.

5. Apparatus for feeding to a processing machine continuous cordage including a plurality of conductors with a continuous covering thereover and having the conductors thrown in loops through and out of the covering at points along the covering spaced apart equal predetermined distances, which comprises an endless chain, means for moving the chain along a predetermined path having a loading point and a delivery point, a plurality of arms carried pivotally by the chain at points spaced along the chain distances greater than the distances that said points on such cordage are spaced apart, a plurality of yokes each carried by one of the free ends of the arms, a plurality of cam followers each carried by one of the arms, and a cam track engaging the cam follower for successively moving the yokes through the cam followers and the arms to positions extending outwardly from the chain as the yokes are moved successively toward the loading point, for successively holding the yokes in such positions as the yokes are moved to the delivery point and for successively withdrawing the yokes from such positions at the delivery point.

6. An apparatus for advancing cordage, which comprises an endless traction element mounted for movement along a path for supporting a length of cordage on a portion thereof, means for advancing the traction element along said path, a cordage-engaging member carried by the traction element and projectable from the inside of the path to the outside of the path for engaging a length of cordage supported by the traction element to advance the cordage along the path, means for projecting the cordage-engaging member from the inside of said endless path to the outside of the path at a predetermined point in the path, means for holding the cordage-engaging member projected to the outside of the path as the member is carried from said point in the path, and means for withdrawing the cordage-engaging member to the inside of the path at a second predetermined point in the path.

7. An apparatus for advancing cordage, which comprises an endless traction element mounted for movement along a path having an upper portion and a lower portion for supporting a length of cordage on the portion thereof in the upper portion of the path, means for advancing the traction element along said path, a cordage-engaging member carried by the traction element and projectable from the inside of the path to the outside of the path for engaging a length of cordage supported by the traction element to advance the cordage along the upper portion of the path, means for projecting the cordage-engaging member from the inside of said endless path to the outside of the path at a point in the path prior to the start of the upper portion of the path, means for holding the cordage-engaging member projected to the outside of the path as the member is carried along the upper portion of the path, and means for withdrawing the cordage-engaging member to the inside of the path at the end of the upper portion of the path.

8. An apparatus for advancing cordage, which comprises an endless traction element mounted for movement along a path, said traction element including a pair of chains spaced laterally apart and a plurality of supports for interconnecting the chains and supporting a length of cordage, means for advancing the traction element along said path, a cordage-engaging member carried by the traction element and projectable between the supports from the inside of the path to the outside of the path for engaging cordage supported by the supports to advance the cordage along the path, means for projecting the cordage-engaging member between the supports from the inside of said endless path to the outside of the path at a predetermined point in the path, means for holding the cordage-engaging member projected between the supports to the outside of the path as the member is carried from said point in the path, and means for withdrawing the cordage-engaging member between the supports to the inside of the path at a second point in the path.

9. An apparatus for advancing cordage, which comprises an endless traction element mounted for movement along a predetermined endless path for supporting a length of cordage on a portion of said path, said traction element having an opening therein, means for advancing the traction element along said path, a bifurcated member carried by the traction element and projectable through the opening in the traction element from the inside of the path to the outside of the path for engaging cordage supported by the traction element to advance the cordage along the path, means for projecting the bifurcated member through the opening in the element from the inside of said endless path to the outside of the path, means for holding the bifurcated member projected through the opening in the traction element to the outside of the path as the member is carried along a predetermined portion of the path, and means for withdrawing the bifurcated member through the opening in the traction element to the inside of the path at the end of said portion of the path.

10. Apparatus for feeding to a processing machine continuous cordage including a plurality of conductors with a continuous covering thereover and having the conductors thereof thrown in loops through and out of the covering at points along the covering spaced apart equal predetermined distances, which comprises an endless traction element mounted for movement along a path for supporting such cordage on a portion thereof, means for advancing the traction element along said path, a yoke carried by the traction element and having a notch therein large enough to permit portions of such cordage between said points to slide therethrough and small enough to prevent a portion of the cordage at such a point from sliding therethrough for advancing the cordage along the path, means for projecting the yoke from the inside of said path to the outside of the path at a predetermined point in the path, means for holding the yoke in a position projecting outside of the path as the yoke is carried from said point in the path, and means for withdrawing the yoke from the outside of the path to the inside of the path at a second predetermined point in the path.

11. Apparatus for feeding to a processing machine continuous cordage including a plurality of conductors with a continuous covering thereover and having the conductors thereof thrown in loops through and out of the covering at points along the covering spaced apart equal predetermined distances, which comprises an endless traction element mounted for movement along a path having an upper portion and a lower portion for supporting such cordage on the portion thereof in the upper portion of the path, means for advancing the traction element along the path, a puller carried by the traction element and projectable from the inside of the path to the outside of the path, said puller having a notch therein large enough to permit portions of such cordage between said points to slide therethrough and small enough to prevent a portion of the cordage at such a point from sliding therethrough for engaging the looped portions of the conductors to advance the cordage along the upper portion of the path, means for projecting the puller from the inside of the path to the outside of the path at a point therein prior to the start of the upper portion of the path, means for holding the puller projected to the outside of the path as the puller is carried along the upper portion of the path, and means for withdrawing the puller from the outside of the path to the inside of the path at a point near the end of the upper portion of the path.

ROBERT T. ADAMS.
JULIUS A. WAGNER.

REFERENCES CITED

The following references are of record in the file of this patent:

UNITED STATES PATENTS

| Number | Name | Date |
|---|---|---|
| 1,960,462 | Swanson | May 29, 1934 |
| 2,196,900 | Girard et al. | Apr. 9, 1940 |
| 2,339,762 | Bruestle | Jan. 25, 1944 |
| 2,415,592 | Hoenecke | Feb. 11, 1947 |
| 2,426,169 | Adams et al. | Aug. 26, 1947 |